(12) United States Patent
Lin

(10) Patent No.: US 6,705,891 B1
(45) Date of Patent: Mar. 16, 2004

(54) CASE FOR PORTABLE STORAGE PERIPHERAL EQUIPMENT

(75) Inventor: Yi-Sheng Lin, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/330,988

(22) Filed: Dec. 24, 2002

Related U.S. Application Data

(63) Continuation-in-part of application No. 29/169,765, filed on Oct. 24, 2002.

(51) Int. Cl.[7] ............................................... H01R 13/60
(52) U.S. Cl. ........................................ 439/528; 439/501
(58) Field of Search .................................. 439/528, 501

(56) References Cited

U.S. PATENT DOCUMENTS

| | | | | |
|---|---|---|---|---|
| 5,071,367 A | * | 12/1991 | Luu | 439/501 |
| 5,507,667 A | * | 4/1996 | Hahan et al. | 439/528 |
| 6,058,089 A | * | 5/2000 | Youens et al. | 439/528 |
| 6,334,788 B1 | * | 1/2002 | Sakaguchi et al. | 439/528 |
| 6,428,348 B1 | * | 8/2002 | Bean | 439/501 |

\* cited by examiner

Primary Examiner—Gary Paumen
(74) Attorney, Agent, or Firm—Wei Te Chung

(57) ABSTRACT

A case (1) is provided for receiving a portable storage peripheral equipment which generally accomplishes signal transmission with a computer. The case includes a case body consisting of a top cover (10) and a bottom cover (20), and a cable assembly (30). Each of the top cover and the bottom cover has a sidewall (14) cooperated with each other. Each sidewall defines a groove (142) therein. The groove of the top cover and the groove of the bottom cover together form a receiving channel (126). The cable assembly has a cable (31) and a cable connector (34) at a free end thereof. The cable can extend out of the case body when the cable connector is in a using state and can be retained in the receiving channel when the cable connector is in an unused state. The case does not occupy external space and is convenient for shipping.

2 Claims, 5 Drawing Sheets

CASE FOR PORTABLE STORAGE PERIPHERAL EQUIPMENT

CROSS-REFERENCE TO RELATED APPLICATION

This patent application is a continuation-in-part application of a co-pending application of U.S. patent application Ser. No. 29/169,765, filed Oct. 24, 2002, entitled "CASE FOR PORTABLE STORAGE PERIPHERAL", and also related to other contemporaneously filed applications Ser. No. 10/331,087 filed Dec. 24, 2002, entitled "CASE FOR RECEIVING PORTABLE STORAGE PERIPHERAL EQUIPMENT", Ser. No. 10/331,087 filed Dec. 24, 2002, entitled "CASE FOR PORTABLE STORAGE PERIPHERAL EQUIPMENT HAVING CABLE ASSEMBLY WITH STRAIN RELIEF", and Ser. No. 10/330,651 filed Dec. 24, 2002, entitled "CASE FOR PORTABLE STORAGE PERIPHERAL EQUIPMENT HAVING IMPROVED SHIELDING EFFECT", all invented by the same inventor, and assigned to the same assignee as the present application.

BACKGROUND OF THE INVENTION

1. Field of the Invention

The present invention relates to a case for portable storage peripheral equipment, and particularly to a case receiving a portable storage peripheral equipment of a notebook computer.

2. Description of Related Art

Following the popularity of the data processing machines, i.e., computers, or serves, information processing with the machine, is increased enormously. Generally, the information is stored in an internal store equipment, such as a hard disk, a floppy disk or a compact disc of a computer. However, such internal stores are not satisfied with requirements of the development that the computer becomes portable and low profile. The external portable storage peripheral equipment is developed and becomes more and more popular.

Generally, the external portable storage peripheral equipment is received in a case. An electrical connector such as a Universal Serial Bus (USB) connector, or an International Electrical and Electronics Engineers 1394 (IEEE 1394) connector is mounted to a front portion of the case with a mating port of the connector exposing out the case. The electrical connector electrically connects the portable storage peripheral equipment with a device connector mounted on a mother board of the notebook computer by an additional cable assembly for providing signal transmission. In use, the electrical connector mounted in the case is always mated or unmated with a complementary connector on one end of the cable assembly. This frequent mating or unmating operation causes terminals of the connector damaged. In another use, the cable connector assembly directly extends out from the case and the connector at a free end of the cable directly mates with the device connector on the mother board of the notebook computer. However, when the cable assembly does not mate with the device connector, the cable assembly is remained outside of the case and not convenient for carrying.

To solve the problem, the integrated structure of the cable assembly and the case is proposed. Understandably, the case need not design to comprise an electrical connector mating with the cable connector of the cable assembly since the cable extends directly out of the case. Problem exists in the shipping of the case because the peripheral cable extending out of the case is superfluous, and the cable occupies more space.

Hence, a case for portable storage peripheral equipment is required to overcome the disadvantages of the related art.

SUMMARY OF THE INVENTION

Accordingly, an object of the present invention is to provide a case for portable storage peripheral equipment that a cable extending out from the case can be retained in the case.

In order to achieve the object set forth, a case in accordance with the present invention is provided. The case includes a case body consisting of a top cover and a bottom cover, and a cable assembly. Each of the top cover and the bottom cover has a sidewall cooperated with each other. Each sidewall defines a groove therein. The groove of the top cover and the groove of the bottom cover together form a receiving channel. The cable assembly has a cable and a cable connector at a free end thereof. The cable can extend out of the case body when the cable connector is in using state and can be retained in the receiving channel when the cable connector is in unused state. The case does not occupy external space and is convenient for shipping.

Other objects, advantages and novel features of the invention will become more apparent from the following detailed description when taken in conjunction with the accompanying drawings.

DETAILED DESCRIPTION OF THE INVENTION

Figure 1:
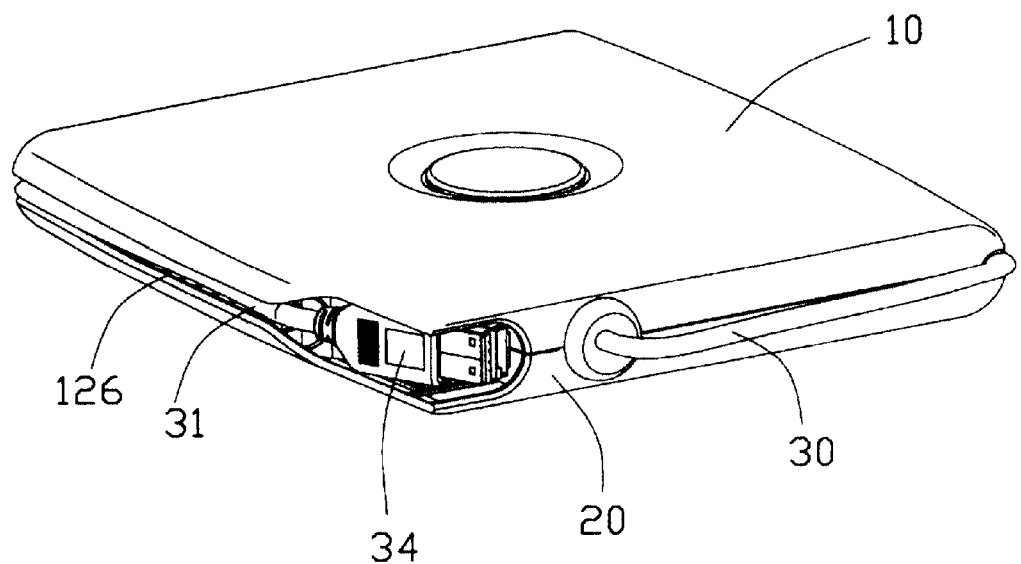
FIG. 1 is an assembled perspective view of a case for portable storage peripheral equipment in accordance with the present invention with a cable assembly retained in receiving channels thereof.
Figure 2:
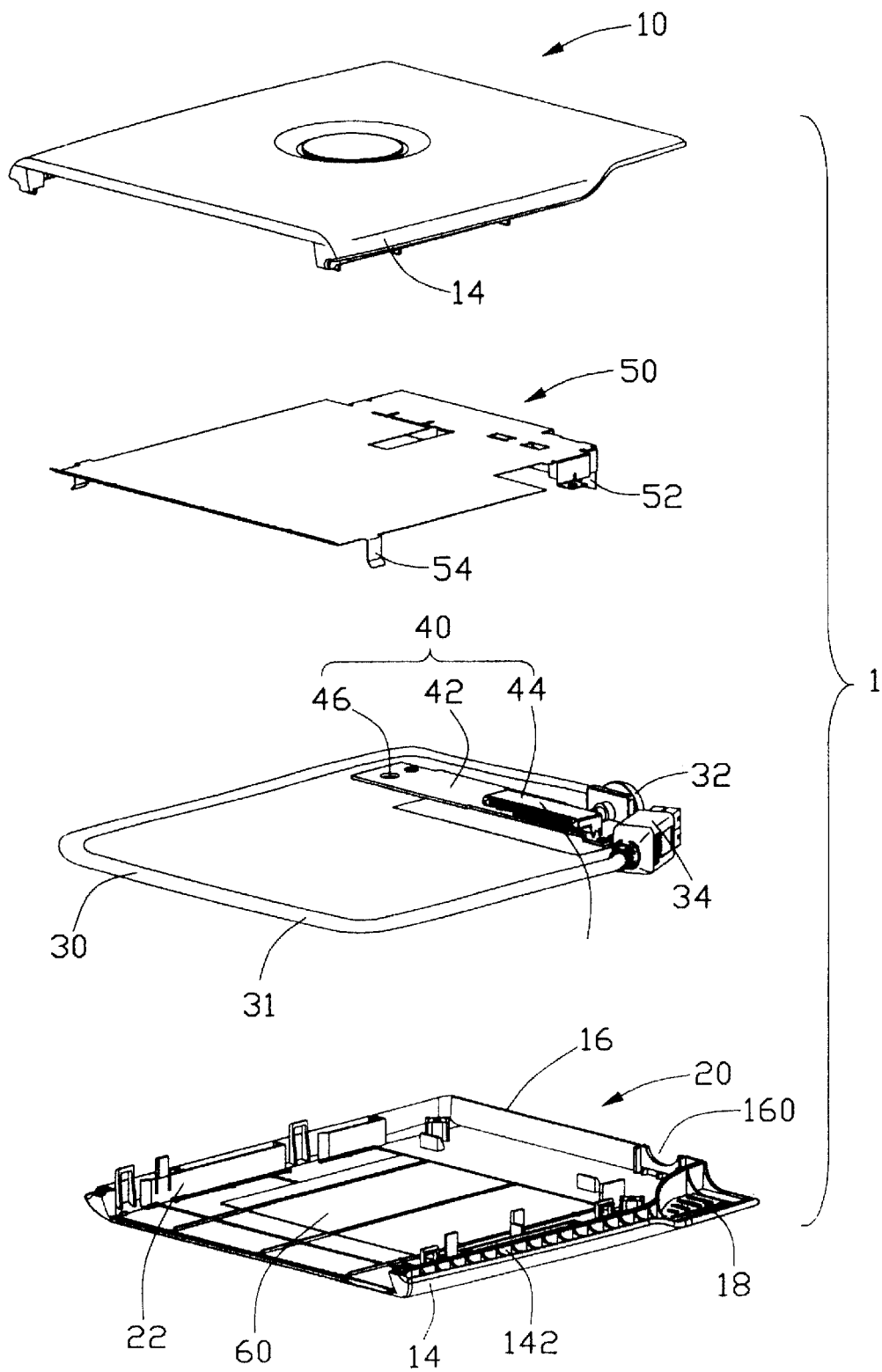
FIG. 2 is an exploded, perspective view of the case for portable storage peripheral equipment of FIG. 1.

Referring to FIGS. 1–2, a case 1 for portable storage peripheral equipment in accordance with the present invention is generally rectangular in shape. The case 1 comprises a case body consisting of a top cover 10 and a bottom cover 20, a cable assembly 30, a printed circuit board module 40 (PCB module), and a shielding 50. The top cover 10 and the bottom cover 20 are assembled together and a receiving space 60 is thus defined therebetween. The PCB module 40 and the shielding 50 are assembled in the receiving space 60. A corresponding portable storage peripheral equipment (not shown), i.e. a portable hard disk, a floppy disk or a compact disc, is accommodated in the receiving space 60 for providing a signal transmission with a notebook computer by the PCB module 40 and the cable assembly 30.

Figure 3:
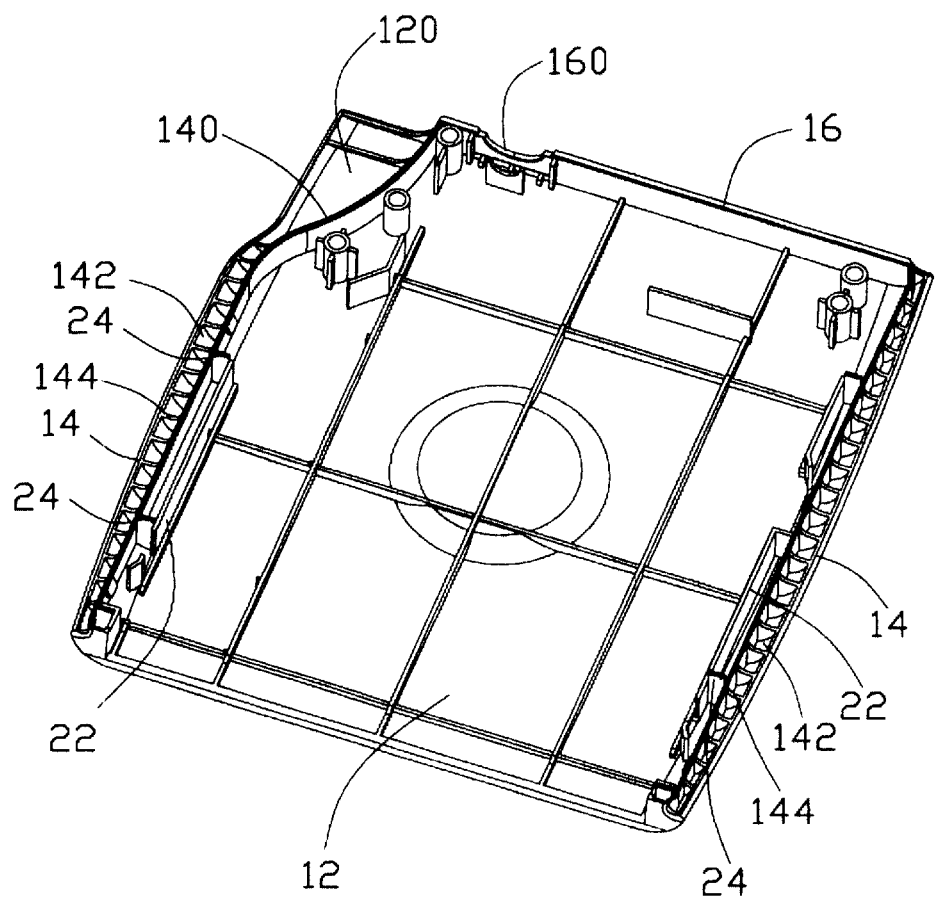
FIG. 3 is a bottom perspective view of a top cover of the case for portable storage peripheral equipment of FIG. 1.
Figure 4:
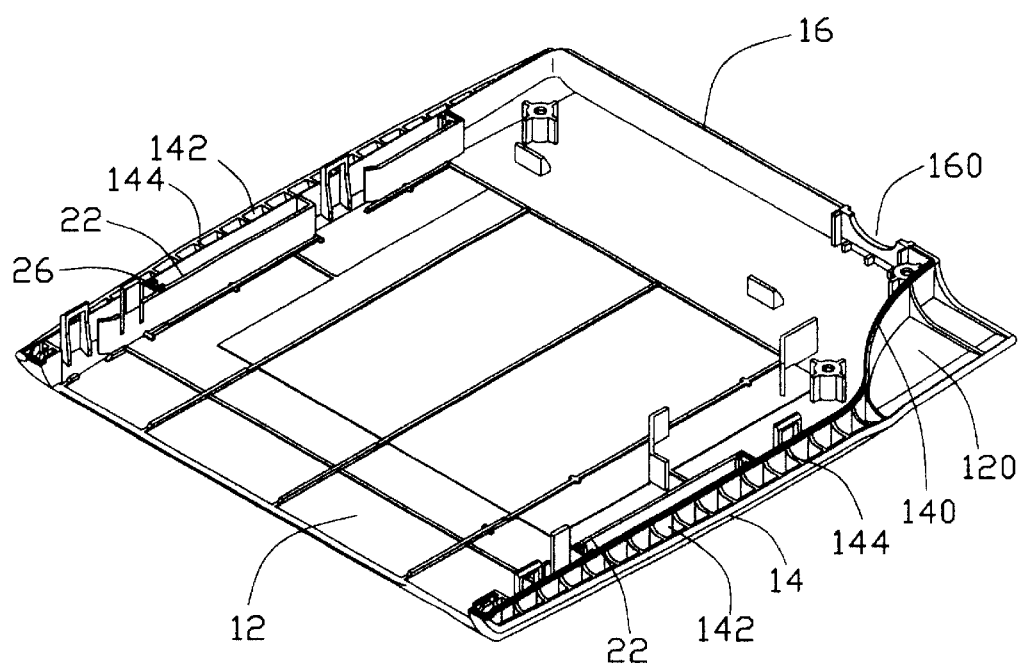
FIG. 4 is a top perspective view of a bottom cover of the case for portable storage peripheral equipment of FIG. 1.

Also referring to FIGS. 2–4, the top cover 10 has a similar configuration with the bottom cover 20 and opposite to the top cover 10. Each cove 10, 20 has a flat board 12, a pair of sidewalls 14 respectively extending curvely and outwardly from the flat board 12, and a front wall 16 extending from a front side of the flat board 12. One sidewall 14 has a transitional part 140 adjacent to the front wall 16. The transitional part 140 deflects towards a center of the flat board 12 relative to the other part of the sidewall 14 and a recess 120 is thus defined by the transitional part 140 and the flat board 12. A pair of cushions 18 is respectively attached on bottom surfaces of the recesses 120 of the top cover 10 and the bottom cover 20. Each front wall 16 defines a hemicycle orifice 160 adjacent to the recess 120.

Each sidewall 14 of the covers 10, 20 defines a groove 142 therein. A plurality of arcuate ribs 144 protrudes equably into the corresponding groove 142. Each flat board 12 of the top cover 10 and the bottom cover 20 protrudes a plurality of baffles 22 parallel to the sidewall 14 thereof adapted for engaging with corresponding portable storage peripheral equipment. The top cover 10 has a plurality of locking flakes 24 protruding downwardly therefrom, as shown in FIG. 3. The bottom cover 20 defines a corresponding number of locking apertures 26 for snugly receiving the locking flakes 24 of the top cover 10, best shown in FIG. 4.

The PCB module 40 includes a printed circuit board 42 and an electrical connector 44 assembled thereto. The printed circuit board 42 defines a plurality of retaining holes 46 corresponding to posts (not labeled) of the top cover 10 provided for arranging and fastening the PCB module 40 in the receiving space 60 by a plurality of corresponding screws (not shown). The cable assembly 30 has a cable 31. The cable 31 has a retaining portion 32 connected to the printed circuit board 42 generally by soldering technology and extending beyond the front wall 16 of the case 1. The other end of the cable 31 connects a cable connector 34 for mating with a device connector mounted on a mother board of the notebook computer.

In assembly, the PCB module 40 is assembled in the receiving space 60 adjacent to the front wall 16. The shielding 50, generally fabricated from metal or other electrically conductive materials, is assembled on an inner surface of the flat board 12 of the top cover 10. The shielding 50 has a front wall 52 and a plurality of positioning legs 54 extending downwardly therefrom for supporting to the flat board 12 of bottom cover 20. The locking flakes 24, thereafter, are inserted in corresponding locking apertures 26. The top cover 10 and the bottom cover 20 are thus fastened with each other. The hemicycle orifices 160 of the top cover 10 and the bottom cover 20 inosculate to each other to provide a circular aperture (not labeled). The retaining portion 32 of the cable 31 extends through the circular aperture. The grooves 142 of the sidewalls 14 of the top cover 10 and the bottom cover 20 confront to each other and a receiving channel 126 is thus formed by the pair of grooves 142. Similarly, the recesses 120 of the top cover 10 and the bottom cover 20 confront to each other for providing a retaining cavity 128. The retaining cavity 128 has a transversal dimension larger than the receiving slot 126.

Figure 5:
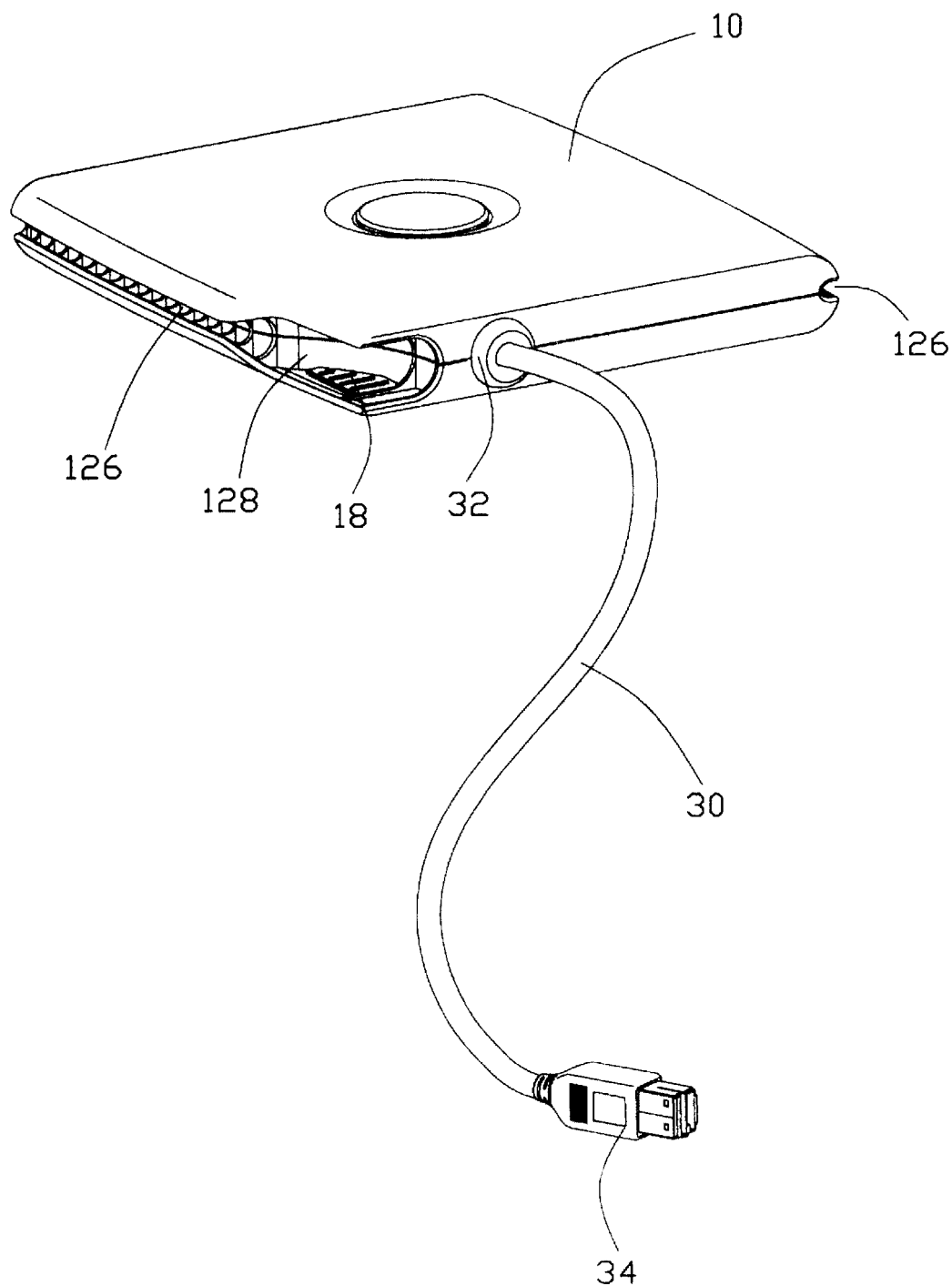
FIG. 5 is an assembled, perspective view of the case for portable storage peripheral equipment with the cable assembly extending outside of the case.

Referring to FIG. 5, in use, the portable storage peripheral equipment is inserted into the receiving space 60 with a complementary connector thereof mating with the electrical connector 44 of the PCB module 40 therein. The cable 31 extends out of the case 1 and the cable connector 34 mates with a device connector of the computer. The signal transmission and conversion between the portable storage peripheral equipment and the computer is thus accomplished by the PCB module 40 and the cable assembly 30.

When the portable storage peripheral equipment received in the case 1 does not mate with the device connector of the computer. The cable 31 extending out of the case 1 surrounds the case body and is nicely locked in the receiving channels 126 of the case 1 with the arcuate ribs 144 supporting corresponding jacket of the cable 31. The cable connector 34 is snugly retained in the retaining cavity 128 and engages with the cushions 18 therein. The cushions 18 defines a plurality of ribs (not labeled) protruding outwardly for abutting against an outer surface of the cable connector 34 which makes the cable connector 34 is reliably retained in the retaining cavity 128.

It should be noted that the receiving channels 126 of the case 1 for portable storage peripheral equipment in the preferred embodiment are elaborately formed by the grooves 142 of the top cover 10 confronting to the grooves 142 of the bottom cover 20. The cable 31 can be retained in the receiving channels 126 when the portable storage peripheral equipment need not connect with the computer. The case 1 does not occupy external space and is convenient for transportation. However, in alternative embodiment, the receiving channel for receiving the cable can be directly defined in the sidewalls of the case body when the case is integrally molded. Of course, it's easily understood the persons skilled in the art that the receiving slot channel can also be defined in the front wall.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A case for portable storage peripheral equipment comprising:

a case body having a perimeter and defining a receiving space surrounded by the perimeter for receiving a portable storage peripheral equipment, the perimeter having a boundary portion, the boundary portion defining a receiving channel extending along the perimeter; and a cable assembly comprising a cable and a cable connector at a free end of the cable;

wherein the cable can extend out of the case when the cable connector is in a using state, and the cable can be received in the receiving channel when the cable connector is in an unused state;

wherein the perimeter of the case body is a pair of sidewalls and a front wall of the case body, a pair of ends of the front wall connecting with the pair of sidewalls;

wherein the boundary portion forms a plurality of arcuate ribs protruding into the channel so as to support a jacket of the cable;

wherein the boundary portion can be a sidewall, or two sidewalls of the case body;

wherein the boundary portion further defines a retaining cavity at one end thereof, the retaining cavity communicates with the channel and can receive the cable connector therein when the cable is retained in the receiving channel;

wherein the retaining cavity has a transversal dimension larger than the receiving channel;

wherein a cushion is formed on a bottom wall surface of the retaining cavity which can prevent the cable connector from sliding out of the retaining cavity;

wherein the perimeter of the case body has a front wall defining an aperture, the cable extending through the aperture and beyond the front wall.

2. A case for portable storage peripheral equipment comprising:

a top cover having a first sidewall, the first sidewall defining a first groove therein;

a bottom cover opposite to the top cover, the bottom cover having a second sidewall corresponding to the first sidewall, the second sidewall defining a second groove confronting with the first groove; and a cable assembly comprising a cable and a cable connector at a free end thereof;

wherein the top cover and the bottom cover are cooperated with each other to form a case body, the first groove and the second groove together forming a receiving channel, the cable can extend out of the case body when the cable connector is in a using state and can be retained in the receiving channel of the case body when the cable connector is in an unused state;

wherein the top cover forms a plurality of locking flakes protruding downwardly therefrom, the bottom cover defines a corresponding number of locking apertures snugly receiving the locking flakes therein to fasten the top cover and the bottom cover together;

wherein each sidewall forms a plurality of ribs protruding into the receiving channel so as to support a jacket of the cable;

wherein the top cover defines a first recess in one end of the first sidewall, the bottom cover defines a second recess opposite to the first recess of the top cover, the first and second recesses together form a retaining cavity communicating with the receiving channel;

wherein the cable connector is accommodated in the retaining cavity;

wherein the top cover has a first front wall defining a first orifice, and the bottom cover has a second front wall cooperating with the first front wall and defines a second orifice inosculating the first orifice to form an aperture;

wherein the cable extends through the aperture and beyond the first and second front walls of the case body.

* * * * *